J. ANDERSON.
MUD CHAIN COUPLING.
APPLICATION FILED JUNE 5, 1919.

1,314,114.

Patented Aug. 26, 1919.

WITNESSES.
Eber Anderson
E. Paul Anderson

INVENTOR.
John Anderson
BY
HyM Stackpole
ATTORNEY.

UNITED STATES PATENT OFFICE.

JOHN ANDERSON, OF GARFIELD TOWNSHIP, CLAY COUNTY, KANSAS.

MUD-CHAIN COUPLING.

1,314,114.  Specification of Letters Patent.  Patented Aug. 26, 1919.

Application filed June 5, 1919. Serial No. 301,903.

*To all whom it may concern:*

Be it known that I, JOHN ANDERSON, a citizen of the United States, residing on R. D. No. 1, Box 44, Garfield township, in the county of Clay and State of Kansas, have invented new and useful Improvements in Mud-Chain Couplings, of which the following is a specification, reference being had to the accompanying drawings, forming a part hereof.

My invention relates to couplings for automobile mud-chains, and the objects are to make a simple, easily applied and secure coupling which may be readily removed as desired.

I attain these objects by means of the mechanism hereinafter described and illustrated by the accompanying drawing; in which,—

Figure 1:
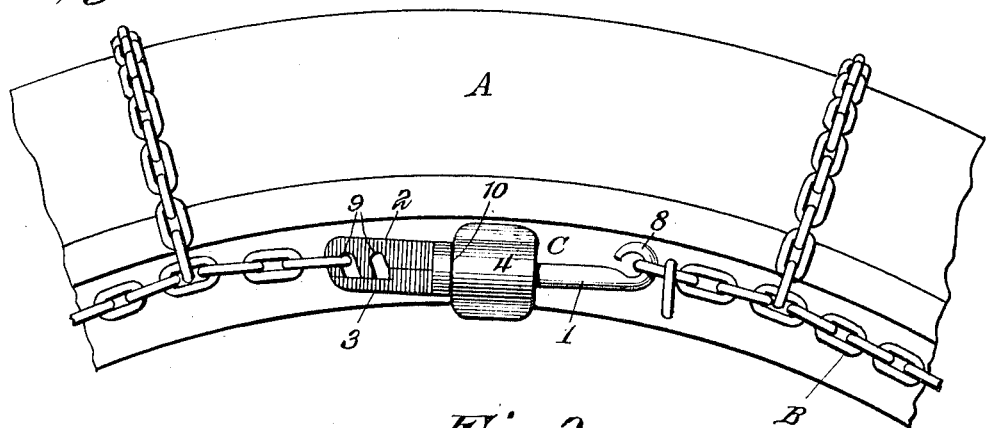
Figure 2:
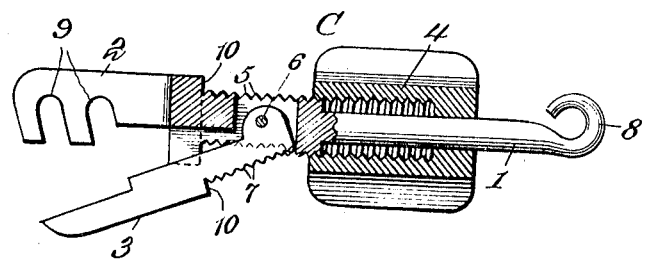
Figure 3:
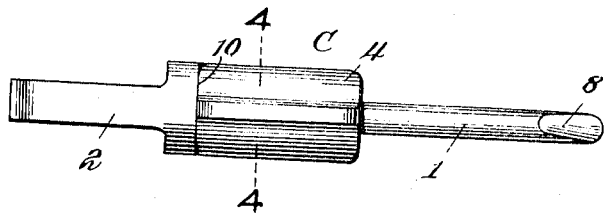

Figure 1 is a section of an automobile tire and mud-chain with my improved coupling applied;

Fig. 2, a longitudinal sectional view of my improved coupling;

Fig. 3, a longitudinal view of the coupling; and

Figure 4:
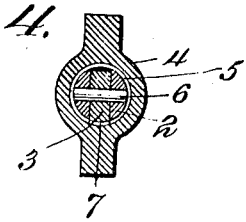

Fig. 4, a cross-sectional view of same on the line 4—4 of Fig. 3.

Similar numerals of reference indicate like parts throughout the several views.

A illustrates an automobile tire; B, a mud-chain, and C, my improved coupling, of which it is designed there should be one on each side of the tire. Stem 1 is provided with jaws 2, 3, the latter being hinged or pivoted at 6. One of the jaws is provided with a notch or notches 9 for reception of a link of the mud-chain, the opposite end of the stem 1, being formed into a hook to which the other end of the chain is attached. Stem 1 has threads 5 near midway of its length, with justifying notches or sections of thread 7 cut in pivoted jaw 3. Nut 4, is designed to screw over the pivoted end of said jaws and hold them in closed position.

To apply my device, the mud-chain being placed around the tire in proper position, a coupling is attached at one side of the tire by hook 8 to one end of the chain, the opposite end of the chain is caused to engage one of the notches on the other end of the coupling, the jaws 2 and 3 are then closed and nut 4 screwed over them up to the shoulders 10—10. Another coupling placed on the opposite side of the tire is attached to the chain in like manner. The mud-chain is thus held in place until it is desired to remove it, which may be done after removing the coupling by reversing the described process.

Some of the advantages of my invention are that it may be easily applied or removed, is interchangeable and may be used for a similar purpose on any of the mud-chains now in common use and is strong and durable.

Having thus described my invention what I claim as new and desire to secure by Letters-Patent is,—

An article of the class described, comprising a stem, a hook at one end of said stem to engage one end of a chain, and jaws at the opposite end thereof, one of which jaws is pivoted in position to close over the other jaw, a notch in one jaw to engage the opposite end of said chain, threads on said stem and pivoted jaw and a nut engaging said threads for the purpose of closing over said jaws and holding them in closed position.

JOHN ANDERSON.

Witnessed by—
  W. T ROCHE,
  FRANCIS KRAMER,